(12) United States Patent
Seeholzer et al.

(10) Patent No.: US 11,421,801 B2
(45) Date of Patent: Aug. 23, 2022

(54) GRIPPER UNIT FOR GRIPPING AND HANDLING CABLE ENDS OF TWO CABLES, LOADING STATION WITH THE GRIPPER UNIT AND METHOD FOR THE PROVISIONING OF PLUG HOUSINGS

(71) Applicant: Komax Holding AG, Dierikon (CH)

(72) Inventors: Vital Seeholzer, Walchwil (CH); Thomas Bussmann, Lauerz (CH)

(73) Assignee: KOMAX HOLDING AG, Dierikon (CH)

( * ) Notice: Subject to any disclaimer, the term of this patent is extended or adjusted under 35 U.S.C. 154(b) by 0 days.

(21) Appl. No.: 16/774,036

(22) Filed: Jan. 28, 2020

(65) Prior Publication Data
US 2020/0248842 A1 Aug. 6, 2020

(30) Foreign Application Priority Data
Feb. 1, 2019 (EP) .................... 19155089

(51) Int. Cl.
*F16L 3/10* (2006.01)
*F16L 3/22* (2006.01)
*F16L 3/237* (2006.01)

(52) U.S. Cl.
CPC ............. *F16L 3/1066* (2013.01); *F16L 3/222* (2013.01); *F16L 3/237* (2013.01)

(58) Field of Classification Search
CPC ......... F16L 3/1066; F16L 3/222; F16L 3/237; F16B 2/14; F16B 2/04; F16B 2/06; F16B 2/065; F16B 2/08; F16B 2/10; F16B 2/12; F16B 2/18; H01R 13/432; H01R 43/20; H01B 13/01236; H01B 13/01218; H01B 13/012

USPC ........................................................ 248/68.1
See application file for complete search history.

(56) References Cited

U.S. PATENT DOCUMENTS

| | | | | | |
|---|---|---|---|---|---|
| 2,441,304 | A | * | 5/1948 | West .................... | H01R 4/50 403/368 |
| 2,621,384 | A | * | 12/1952 | Slaughter ............. | F16L 3/24 24/526 |
| 2,674,772 | A | * | 4/1954 | Jacobs .................. | H02G 3/32 248/68.1 |

(Continued)

FOREIGN PATENT DOCUMENTS

| DE | 4303122 A1 | 8/1994 |
|---|---|---|
| EP | 3301769 A1 | 4/2018 |
| FR | 2691296 A1 | 11/1993 |

*Primary Examiner* — Christopher Garft
(74) *Attorney, Agent, or Firm* — William J. Clemens; Shumaker, Loop & Kendrick, LLP

(57) ABSTRACT

A double gripper for gripping and handling cable ends of two cables of a twisted cable harness in a fitting station for provisioning plug housings includes two gripper jaws each with an upper member arranged above a lower jaw member. The double gripper further includes two engagement members arranged between the upper and lower jaw members with which the cables are supported. The engagement members can be moved independently from the gripper jaws. A distance between the cables can be varied by moving the engagement members between the cables transverse to longitudinal axes of the cables. Each of the engagement members is formed as a wedge with at least one effective wedge surface.

21 Claims, 9 Drawing Sheets

(56) References Cited

U.S. PATENT DOCUMENTS

| | | | | |
|---|---|---|---|---|
| 3,171,632 A * | 3/1965 | Jines | ........................ | F16M 7/00 |
| | | | | 254/104 |
| 3,489,847 A * | 1/1970 | Netzel | ...................... | H02G 3/26 |
| | | | | 248/68.1 |
| 3,521,332 A * | 7/1970 | Kramer | .................... | F16L 3/13 |
| | | | | 248/912 |
| 3,829,825 A * | 8/1974 | Hawkins | ................ | H01R 11/09 |
| | | | | 439/810 |
| 9,979,143 B2 * | 5/2018 | Renggli | ................. | H01R 43/16 |
| 2004/0094674 A1 * | 5/2004 | Bozmoski | ........... | F01N 13/1805 |
| | | | | 180/219 |
| 2015/0367500 A1 * | 12/2015 | Bukovitz | ................. | F16B 2/18 |
| | | | | 248/514 |
| 2016/0181740 A1 * | 6/2016 | Renggli | ................ | H01R 13/73 |
| | | | | 439/529 |
| 2017/0089058 A1 * | 3/2017 | Roth | ..................... | E04B 1/5812 |
| 2018/0155939 A1 * | 6/2018 | Aldridge | ............... | F16B 7/0433 |

* cited by examiner

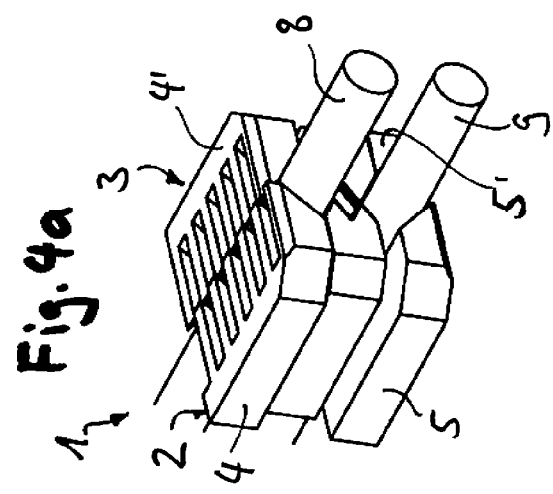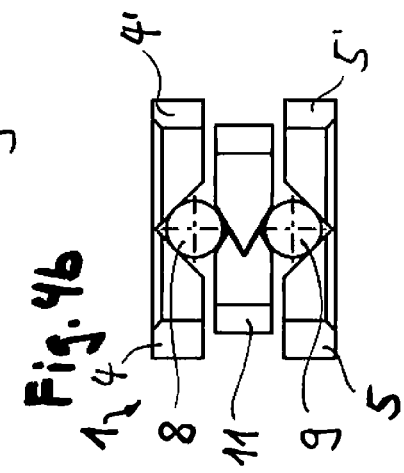
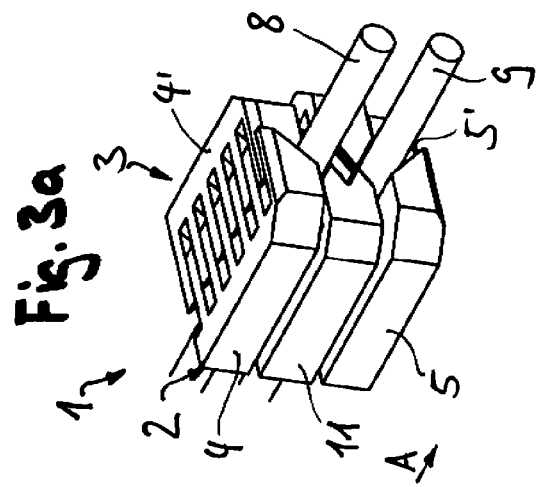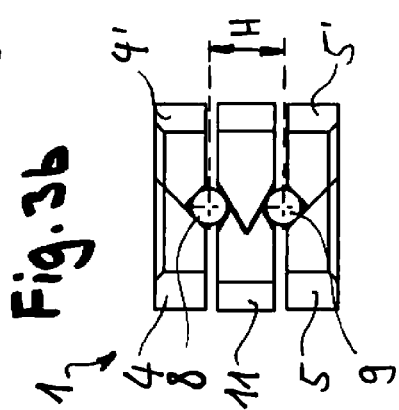
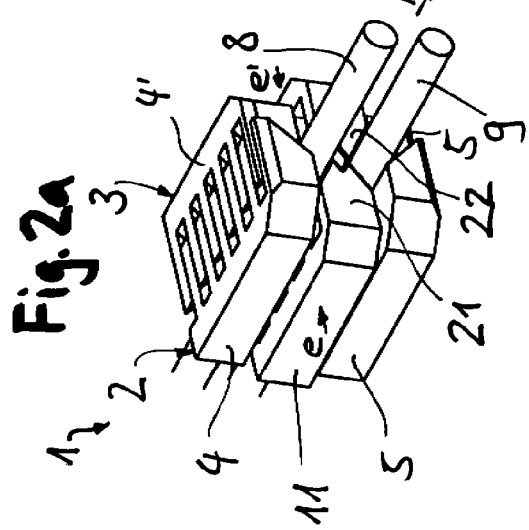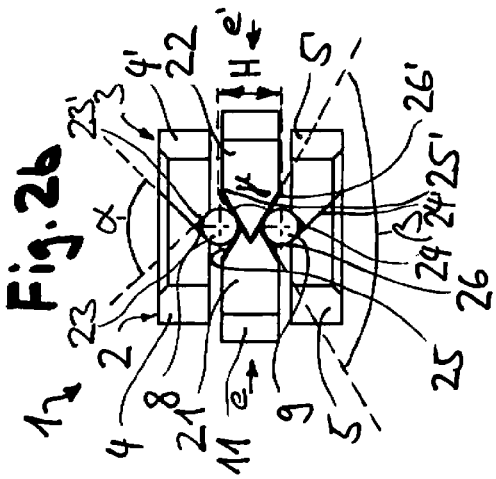

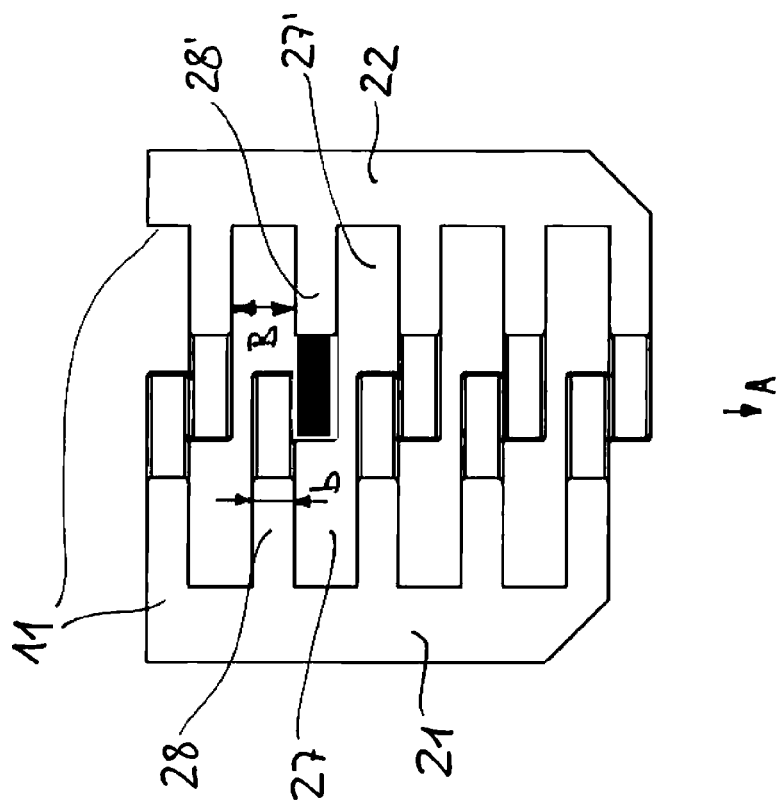
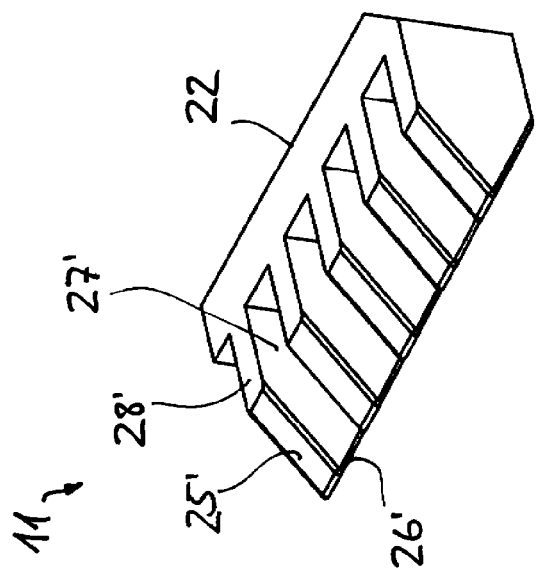

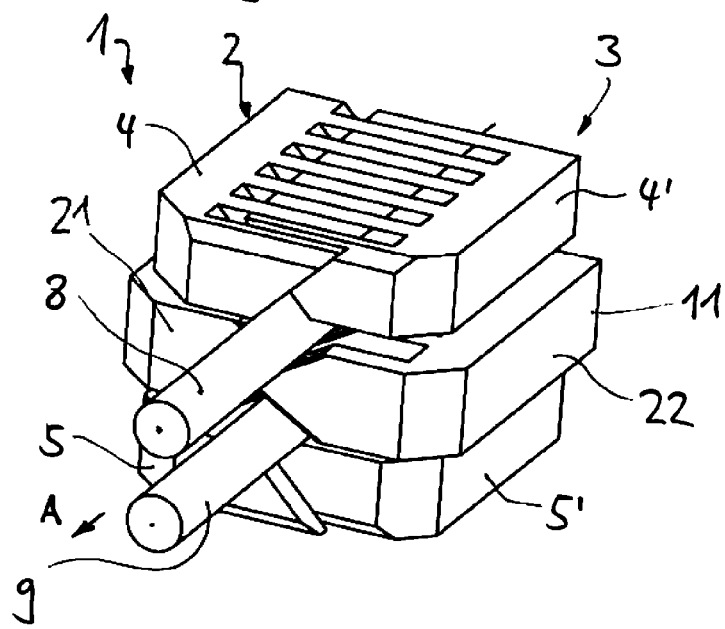
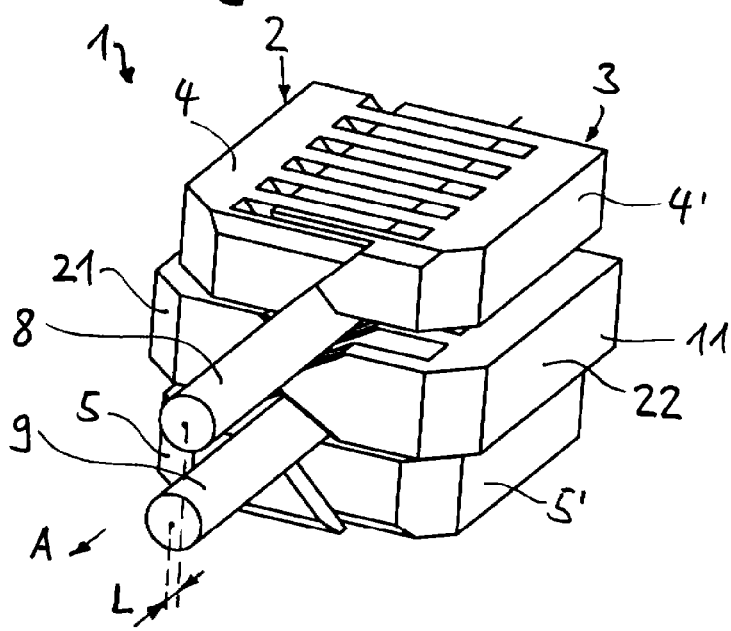

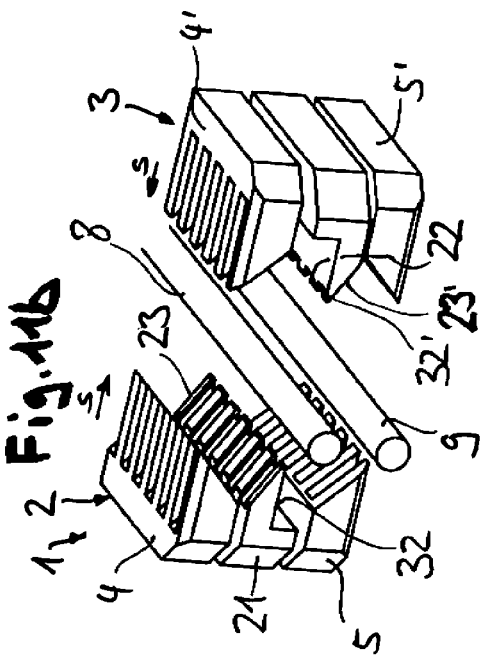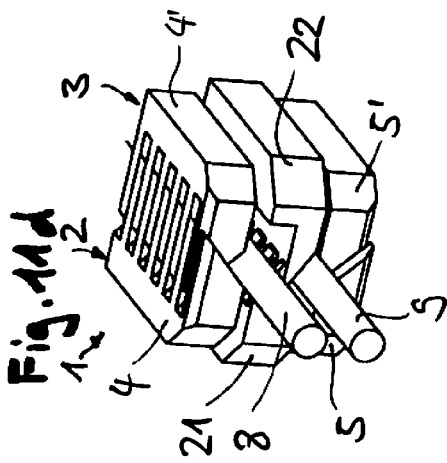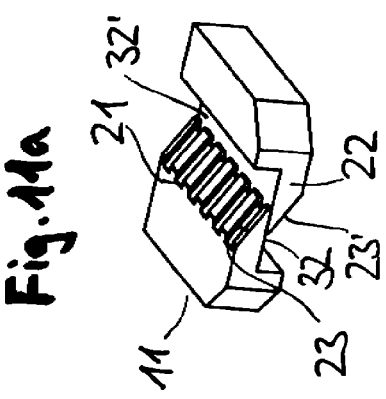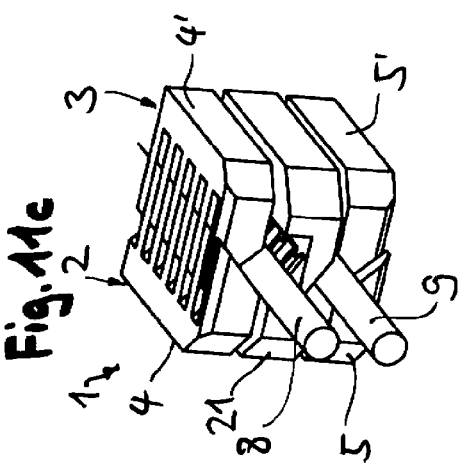

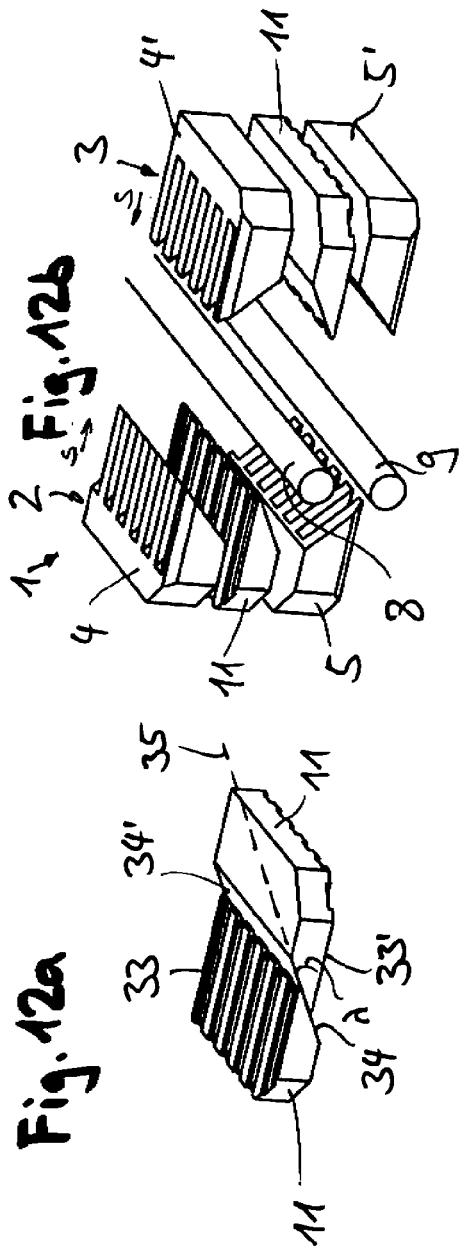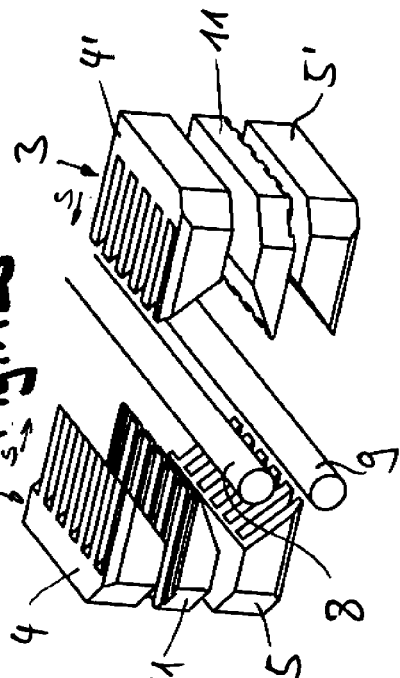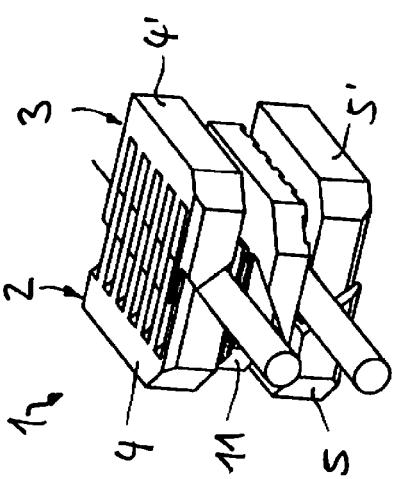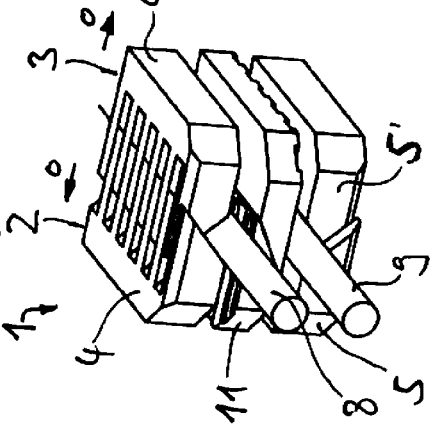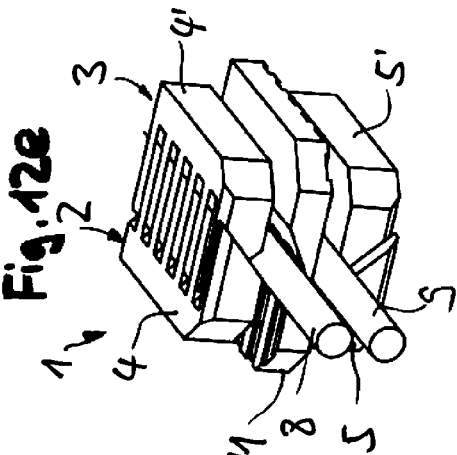

GRIPPER UNIT FOR GRIPPING AND HANDLING CABLE ENDS OF TWO CABLES, LOADING STATION WITH THE GRIPPER UNIT AND METHOD FOR THE PROVISIONING OF PLUG HOUSINGS

FIELD

The invention relates to a gripper unit for gripping and handling cable ends of two cables of a cable harness. Furthermore, the invention relates to an assembly station for provisioning of plug housings with cable ends by means of such a gripper unit and a method for provisioning plug housings.

BACKGROUND

Cable harnesses such as those used in automobiles or aircraft consist of several cables, which are provided with plug housings at their prefabricated cable ends. For this purpose, the prefabricated cable ends, i.e. the cable ends that are cut to length, stripped and provided with contact parts (for example crimp contacts), are inserted into chambers or receivers of the plug housing. As a rule, the cables of a cable harness with the cable ends to be provisioned are present individually and are also individually introduced into the chambers of the plug housing by means of corresponding mechanical devices. More and more cable harnesses consist of several cable strands made from a plurality of cables, mainly twisted cables, for which there is also a need to provision the free, in particular untwisted, and optionally elongated cable ends of the cable harness. Twisted cables are characterized by particularly good signal transmission qualities. In addition to twisted cables, untwisted cables of cable harnesses or other multi-cable systems, in which the cables are only arranged side by side and combined in a group, can be used as well. In general, there is a need to be able to provision cable strands made up of at least two cables, in particular twisted cables, with corresponding mechanical devices which are known to the person skilled in the art as cable fitting stations, on the cable end side.

The automatic provisioning of plug housings with twisted cables is complicated. A particularly important component of the processing station is the gripper unit, which grips the cable ends of the cables, brings the cable ends to the plug housings and inserts these into them. One objective is to keep the length region of the cable ends, which is not twisted, as small as possible. This requires that both ends must be brought into the plug housing at almost the same time.

A generically comparable gripper unit for gripping and handling the cable ends of two cables of a cable harness for a fitting station for provisioning plug housings with cable ends has become known, for example, from EP 3 301 769 A1. The gripper unit consists of two consecutively arranged cable grippers. Each cable gripper comprises two gripper jaws which can be moved between an open position and a closed position. The individual ends of the twisted cable are held each by a cable gripper. The two grippers are positioned consecutively in the cable direction. The other individual cable end, which is not held by the cable gripper, passes through a slightly enlarged guide channel of the cable gripper. To insert the twisted cable into the plug housing, one of the cable ends is pushed forward by a few millimeters in the cable direction. The tips of the two contact parts are thus no longer flush with each other in the cable direction. This makes it possible to successively point the contact parts toward the corresponding inlet openings and to insert them. The gripper jaws of the cable grippers are designed specifically for predetermined cable diameters and a fixed distance between the two cables. Furthermore, this solution requires comparatively long non-twisted or untwisted lengths of the cable ends of the cable of the twisted wire harness.

SUMMARY

It is therefore one object of the present invention to avoid the disadvantages of the known methods and, in particular, to provide an improved gripper unit for gripping and handling cable ends of two cables of a cable harness. The gripper unit itself and the fitting station equipped with the gripper unit should allow for high variability and be characterized by a wide range of applications.

According to the invention, this task is achieved by a gripper unit that is used for gripping and handling the cable ends of two cables, in particular of a twisted cable harness, which extend along a longitudinal, and proximally axis-parallel direction. The gripper unit comprises two gripper jaws. The gripper jaws can be moved in a closing or an opening direction transversely to the longitudinal direction, and inversely between an open position and a closed position. At least one of the gripper jaws and preferably each gripper jaw comprises two components, which are preferably configured as separate components, jaw members, which are arranged above each other with respect to the longitudinal direction, wherein the jaw members can act on the cables from the outside in a clamping manner when in the closed position. The gripper unit furthermore comprises at least one activatable engagement member, with which at least one of the cables can be acted on from the inside in a supporting manner, with the engagement member, which is preferably configured as a separate component with respect to the jaw members being arranged between the jaw members of one of the gripper jaws. Jaw members that are positioned on top of each other and that can be moved away from each other may each be assigned to one of the cables of the cable harness. These jaw members may form a pair of jaw members.

Unless specifically stated, movements in the aforesaid closing and closing direction, which are transverse to the longitudinal direction, are referred to whenever reference is made below to movements with respect to the gripper jaws, their jaw members and movements with respect to the one or more engagement members.

The clamping force applied to the respective cable of, for example, the total of two cables of the cable harness by the corresponding jaw members from the outside means that the cable is retained in the region of the cables facing away from each other in a contacting and clamping manner; in contrast, the application of force that is providing support from the inside takes place in a sector of the cable which faces the adjacent cable, i.e. in a region within the preferably non-twisted or untwisted end of the cable strand which is located between the two cables.

The gripper unit according to the invention is characterized by a compact design. The extension of the gripper unit in the longitudinal direction can be kept small, which makes short cable projections possible. The non-twisted or untwisted lengths of the cable ends of the cables of the twisted wire harness can be considerably shorter. Another advantage of the gripper unit is that it has a high variability and is widely applicable.

This gripper unit may in particular be a gripper unit of a fitting station for provisioning plug housings with prefabricated cable ends. It is also conceivable, however, to use the gripper unit according to the invention in other cable processing stations for assembling cables. The gripper unit could, for example, be used in a crimping station which applies crimp contacts to the stripped cable ends of cables of a twisted cable harness or in a protective sleeve station.

After a respective activation, the engagement member disposed between the jaw members can be moved back and forth with respect to the one next to it in the transverse direction relative to the longitudinal direction. The advancement or retraction of the at least one engagement member is possible, for example, when the gripper jaws are in the closed position and are in contact with and hold the cables in place.

The gripper unit may, in particular, be a double gripper for a twisted cable harness consisting of two cables. It would also be conceivable to use the gripper unit described below for gripping and handling more than two cables. Such a multiple gripper would have more than one engagement member per gripper jaws. If the cable harness consists of three cables, for example, two engagement members per gripper jaw would have to be provided.

In a preferred embodiment, the at least one engagement member for enabling a relative movement with respect to the associated gripper jaw would, for example, be movable by means of a separate or individual drive independently of the associated gripper jaws. The engagement member can be moved individually or in pairs with an opposing second engagement member. Thus, advantageous relative movements of the engagement member relative to gripper jaws or jaw members of the gripper jaw are possible. When the gripper jaws are in the open position, for example, the engagement member may be moved forward or backward from a starting position to set a desired distance between the two cables relative to the associated gripper jaw. Finally, the gripper jaw, together with engagement member, which has been moved forward or backward from the starting position, may be brought in the closed position. Other modes of operation are also conceivable as well, however. It is conceivable, for example, to move the at least one engagement member toward the cables first. Only after the engagement member or the engagement members act on at least one of the cables from the inside in a supporting manner, the gripper jaws are closed. Alternatively or additionally, the engagement member may, when needed, be moved forward or backward when the gripper jaws are already in the closed position while the gripper jaws remain in the closed position. This way, it is also possible to change the distance between the two cables gripped by the cable gripper.

Another advantage is that the gripper unit is adaptable to cables with different cable diameters.

The aforementioned embodiment with such a movable engagement member could also be advantageous for gripper variants with integral gripper jaws, in which the jaw members of each gripper jaw are made from one piece and are formed for example by a monolithically designed component. This component with the two jaw members could be installed in a housing. The engagement member could then be mounted transversely and preferably slidably mounted in the housing at a right angle from the longitudinal direction.

It is advantageous if the gripper unit has two engagement members which can be moved toward and away from each other. Each gripper jaw may also be assigned an engagement member. Thus, one engagement member is always arranged between the jaw members of one gripper jaw. To increase the distance between the cables, the engagement members are moved towards each other, and the cable spacing can be easily reduced by moving the engagement members away from each other or by retracting them. The desired distance between two cables of the cable harness can be set thus be set in an easy and precise manner. The direction of movement for moving the engagement member into the cable harness (retraction and advancement) and for moving the engagement member away from the cable harness (backward movement) runs in the same direction as the closing and opening direction of the gripper jaws.

It may be particularly advantageous if a separate drive is provided for the at least one engagement member, by means of which the engagement member can be moved between the cable of the cable harness to be able to come in contact with the cables and to push them apart. To operate the gripper jaws at least with respect to the movement between the open position and the closed position, another drive or a plurality of additional drives may be provided. It is possible to precisely control the engagement member or the engagement members thanks to the own drive of the engagement member or the engagement members. The drive may include an electric motor for activating or driving the at least one engagement member. The electric motor may be designed, for example, as a stepping motor, with which the engagement member can be translationally displaced by a specific distance with high precision so as to set the desired distance between the cables. The gripper unit may have a control device or be connected or connectable to a control device, via which the drive with the electric motor or via which another actuator for activating or driving the advancement or the backward movement of the at least one engagement member between the cables can be controlled.

A drive may be assigned to each engagement member. However, a shared drive for moving both engagement members may be advantageous as well. The engagement members may be connected to this drive, whereby a simultaneous, opposite movement of the engagement members is ensured. The two engagement members thus form a pair.

The jaw members may be somewhat slidably mounted in the closing and opening direction in the gripper jaws to compensate for movements of the cable during the retraction and advancement of the at least one engagement member between the cables or during the return movement of the at least one engagement member, which changes the distance between the cables. To maintain the contact between the jaw member to the cable, it may be advantageous if the jaw member is resiliently mounted in the gripper jaws by means of one or more springs. If the jaw members have clamping surfaces for establishing contact with the cables, the respective clamping surface can serve as an abutment flank for the cable along which the cable can be moved to compensate for the spreading movement of the cable when the at least one engagement member is retracted or advanced.

It is conceivable to operate the gripper jaws with a single drive for creating the open position and the closed position. The gripper unit would thus comprise a shared drive, with which all jaw members of the gripper jaws are operable at least with respect to the necessary transverse movements. In view of the variability, however, it may be advantageous if the gripper unit comprises two drives for operating the gripper jaws, wherein jaw members that face each other and that are each associated with one cable can be moved in the closing or opening direction by means of the respective drive.

The engagement member may be a wedge with at least one effective wedge surface. The effective wedge surface is understood to refer to a wedge surface of a wedge which is or can be brought into an operative connection with a cable.

When moving the wedge in the closing direction, the wedge can be brought into contact with a cable by means of the clamping surface. As the wedge advances, the cable may be forced sideways, i.e. transversely to the closing direction. In this way, a lateral movement of the cable to increase the distance between the cables can be achieved. Preferably, the wedge may have two effective wedge surfaces for simultaneously applying a force on both cables and pushing them apart.

In one embodiment, the gripper jaws may have a higher coefficient of friction than the effective wedge surfaces with respect to their clamping surfaces.

The wedge may have a wedge surface that does not come in contact with a cable (non-effective wedge surface) and that does not act on the cable as the wedge moves in the closing direction. This non-effective wedge surface may be a straight wedge surface which is coplanar with the main direction of movement of the wedge corresponding to the closing direction which is transverse to the aforementioned longitudinal direction. The other wedge surface, which in this case has an oblique course, forms the effective wedge surface.

The wedge may be a wedge with two oblique wedge surfaces. The oblique wedge surfaces form the two effective wedge surfaces mentioned. Such a wedge having two oblique wedge surfaces is also known by the term "double wedge". It is particularly preferable if the wedge having two oblique wedge surfaces is symmetrical. The symmetry axis or plane runs coaxially to the main direction of movement of the wedge, which corresponds to the closing direction, which is transverse to the aforementioned longitudinal direction.

The wedge may have two effective wedge surfaces so as to form a double wedge, with the wedge angle of the wedge being between 30° and 90°, preferably between 45° and 70°, and more preferably approximately 60°.

According to one embodiment, the gripper unit may comprise two jaw members with clamping surfaces that face each other and that can be moved toward and away from each other so as to establish contact with the same cable, wherein the two clamping surfaces enclose an angle which is smaller than the angle between the wedge surface of wedges facing each other, which form a pair as well. Preferably, the angle α between the clamping surfaces of the jaw members facing each other may be 90° and the angle between the wedge surfaces of wedges facing away from each other may be 120°. This ensures that a cable can be held securely even if it is only surrounded by one wedge and two jaw members and clamped between these.

The jaw members may have a substantially triangular cross-sectional shape at least in a region facing the cable. The clamping surfaces of two jaw members per gripper jaw can have a V-shaped configuration in the cross-section or in the longitudinal direction.

If the gripper unit has pair-forming engagement members that can be moved toward and away from each other, it may be advantageous if two wedges each having an oblique effective wedge surface and a respective straight wedge surface, are provided as engagement members. The wedges of the pair of engagement members can, while the engagement members are moved forward or backward, be slidable along each other in their straight wedge surfaces in the closing or opening direction. This variant is particularly suitable for cables with sensitive insulation. The straight wedge surfaces thus form sliding surfaces for the mentioned movement (forward or backward travel). The straight wedge surface may have a planar design for the interdependent guiding of the wedges. The effective wedge surfaces may have a profiled design.

In an alternative embodiment, the gripper unit may comprise wedge-shaped engagement members that form a pair and that may be able to move away from each other, wherein the wedge-shaped engagement members each have straight wedge surfaces and oblique wedge surfaces with respect to the direction of travel for moving the engagement members forward or backward. The straight wedge surfaces support the cables. The oblique wedge surfaces of the engagement members can be brought into an operative connection with one another such that the oblique wedge surfaces are interdependently guided when the engagement members are moved forward or backward in the closing or opening direction. This variant is particularly suitable for cables with sensitive insulation, in which a thick, particularly soft plastic casing is used as insulation for the cable.

In order to reduce the friction between the engagement member and the cable, and in particular between the wedge and the cable, the engagement member or wedge may be made of or coated with a plastic material having a low coefficient of friction. Good sliding properties can be achieved, for example, when the engagement member or the wedge is made of a material such as PTFE with low coefficients of friction.

The jaw members may preferably have slot-like recesses and protrusions between the recesses. In this case, the complementary recesses and projections of the jaw members facing each other may be able to move into each other at front sides that are preferably facing each other in relation to the closing direction at least in the closed position. Additionally or alternatively, the gripper unit may comprise two wedges as engagement members, which are facing each other and which can be moved in opposite directions, wherein, in the region of the wedge tips of the wedges, complementary, preferably slot-like recesses that are facing each other and protrusions between the recesses are provided, which can be moved into each other at least in the closed position.

To broaden the area of application, it may be advantageous if the slot width of the recesses is dimensioned larger compared to the width of the opposite protrusions of the respective wedges that are immersed into these in such a way that the wedges are movable relative to each other in the longitudinal direction for creating an offset of the cables.

Another aspect of the invention relates to a fitting station for providing plug housings with prefabricated cable ends by means of the previously described gripper unit, with which the cable ends of two cables of a twisted cable harness can be gripped and the cable ends of the two cables can be inserted into cells of a plug housing. Cells are plug housing receivers or plug housing chambers into which the prefabricated cable ends are plugged or otherwise inserted. Fitting stations equipped with such a gripper unit can be operated variably and efficiently. The twisted cable harnesses equipped with the fitting station meet high quality requirements. Such a fitting station can be downstream from assembly lines or be part of assembly lines. An assembly line may comprise, for example, a stripping station for cutting and stripping the electrical cable, one or more crimping stations for applying crimp contacts to the stripped cable ends, and, where necessary, protective sleeve stations.

Furthermore, the invention relates to a method for provisioning plug housings with prefabricated cable ends from two cables of a twisted cable harness, wherein contacts such as pins, sleeves or crimp contacts are mounted onto the cable ends, preferably using the fitting station referenced above. The method comprises the following steps: gripping of the cable with a cable gripper unit, wherein the outside of the cables is enclosed by gripper jaws and the cables are acted upon from the inside by at least one engagement member, which is inserted between the cables; adjusting the distance between the cables by moving the at least one engagement member forward or backward; and inserting the cable ends of the cables into the desired cells of the plug housing by means of the cable gripper unit, wherein the distance between the cables is maintained. The forward or backward movement of the at least one engagement member for adjusting the distance between the cables can be performed after the outside of the cables has been enclosed by gripper jaws and the cables are already acted upon from the inside by the at least one engagement member in a supporting manner. However, it may also be advantageous if the above-mentioned forward or backward movement of the at least one engagement member is performed prior to or during the first-mentioned step or during the first-mentioned step. Depending on the desired cable distance, the at least one engagement member can thus be moved more or less forward, for example, during a closing process (i.e. when the gripper jaws are moved in the closing direction to create the closed position in which the outside of the gripper jaws are enclosed).

DESCRIPTION OF THE DRAWINGS

Further individual features and advantages of the invention follow from the description of exemplary embodiments below and from the drawings in which:

FIG. 2a shows the gripper unit of FIG. 1, but from a different angle and in a slightly reduced perspective view;

FIG. 2b shows the gripper unit in a front view;

FIG. 3a shows the gripper unit of FIG. 2a with wedges inserted further between the cables in order to increase the distance between the cables;

FIG. 3b shows the gripper unit in the front view;

FIG. 4a shows the gripper unit of FIG. 2a with thicker cables gripped by the gripper unit;

FIG. 4b shows the gripper unit in the front view;

FIG. 6 shows a single wedge of the gripper unit in a slightly enlarged perspective view;

FIG. 7 shows two wedges of the gripper unit in the closed position in a slightly enlarged perspective view;

FIG. 8a is a further perspective view of the gripper unit;

FIG. 8b shows the gripper unit after the performance of a process step for creating an offset;

FIG. 11a shows two wedges in a perspective view for a gripper unit according to a second exemplary embodiment;

FIG. 11b is a perspective view of the gripper unit with the wedges of FIG. 11a in the open position;

FIG. 11c shows the gripper unit in the closed position;

FIG. 11d shows the gripper unit after the retraction of the wedges for decreasing the distance between the cables;

FIG. 12a shows two engagement members in a perspective view for a gripper unit according to a third exemplary embodiment;

FIG. 12b is a perspective view of the gripper unit with the engagement members from FIG. 12a in the open position;

FIG. 12c shows the gripper unit in the closed position with the engagement members moved far into each other;

FIG. 12d shows the gripper unit in the closed position with the engagement members moved into each other;

FIG. 12e shows the gripper unit in the closed position in engagement members that are slightly displaced in comparison to the position shown in FIG. 12d;

DETAILED DESCRIPTION

The following detailed description and appended drawings describe and illustrate various exemplary embodiments of the invention. The description and drawings serve to enable one skilled in the art to make and use the invention and are not intended to limit the scope of the invention in any manner. In respect of the methods disclosed, the steps presented are exemplary in nature, and thus, the order of the steps is not necessary or critical.

Figure 1:
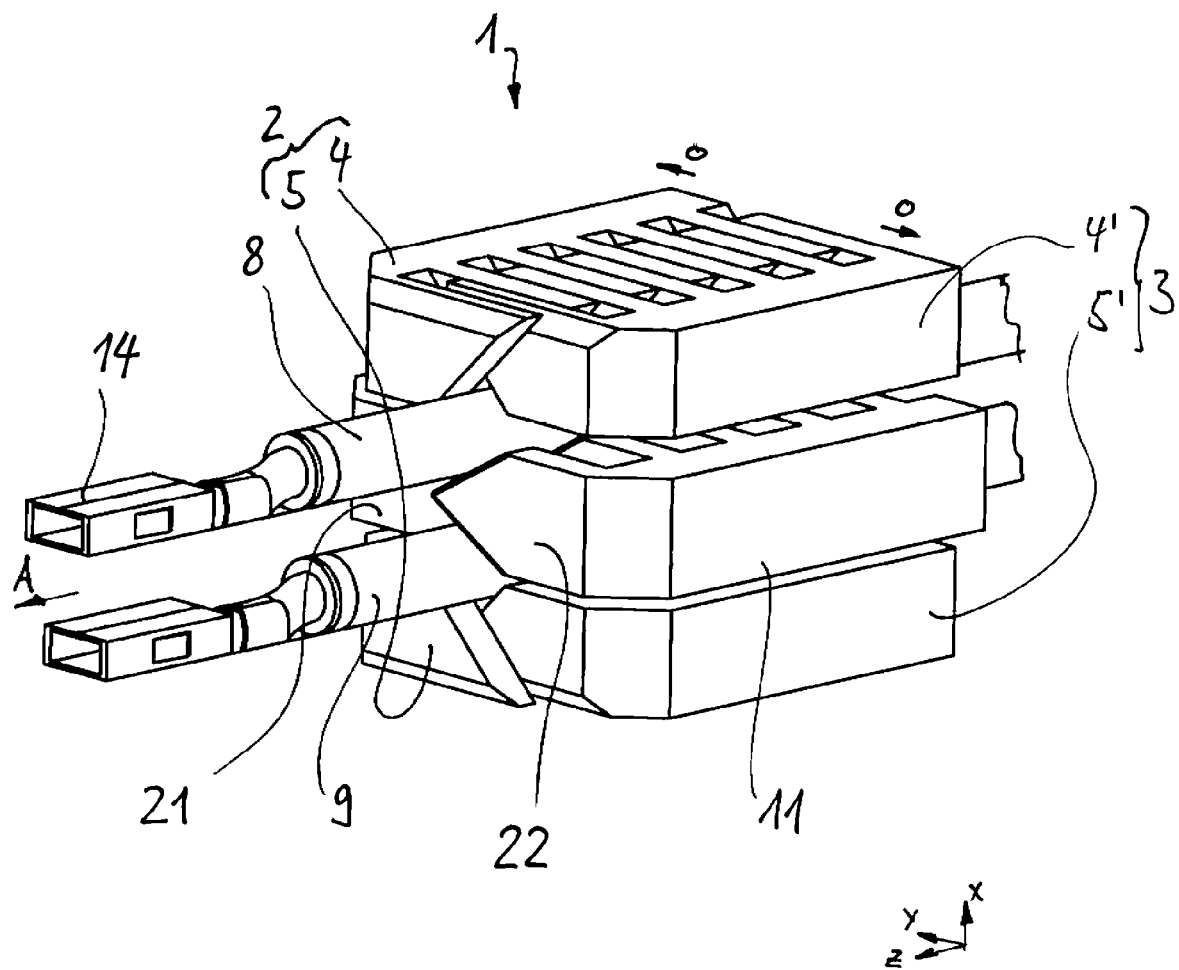
FIG. 1 is a perspective view of a gripper unit according to the invention having two wedges in a closed position and two cables which are gripped by the closed gripper unit.

FIG. 1 shows a gripper unit 1 for gripping and handling the cable ends of two cables 8, 9 of a twisted cable harness, which extend along a longitudinal and proximally axis-parallel direction A. Therefore, for the sake of simplicity, the term "double gripper" will be used hereinafter for the gripper unit 1 which grips the two cables 8, 9.

The double gripper 1 shown here is used in particular for provisioning plug housings with prefabricated cable ends. Crimp contacts 14 are attached to the respective stripped cable ends in this example. The prefabricated cable ends of the cables 8, 9 are brought to the plug housings (not shown here) by the double gripper 1 and inserted into plug housing receivers or plug housing chambers provided for this purpose.

The Cartesian coordinate system shown in FIG. 1 (x-y-z) serves as an aid for understanding the directions and the main movements of the components of the double gripper 1. The double gripper 1 comprises two gripper jaws 2, 3, which are movable transverse to the longitudinal direction A, and the opposite direction between an open position and a closed position in the y-direction. The longitudinal direction A also corresponds to the direction in which the respective cable axes of the cables 8, 9 extend. The gripper jaws 2, 3 consist of two jaw members 4, 4', 5, 5', which are designed as separate components, and which are arranged above each other with respect to the longitudinal direction A. In the closed position shown in FIG. 1, the gripper jaws 2, 3 surround the two cables 8, 9 respectively. The respective cable 8, 9 is acted upon in the closed position for clamping the cable from the outside. The gripper jaws 2, 3, which are closed in FIG. 1, can be moved in the o direction to create the open position.

The gripper unit 1 furthermore comprises two engagement members 11, with which the cables 8, 9 are acted upon from the inside in a supporting manner in the closed position. One engagement member 11 each is arranged between the jaw members 4, 5; 4', 5' of the gripper jaws 2, 3. The engagement members 11 penetrating between the two cables 8, 9 are designed as separate components with respect to the jaw members 4, 4', 5, 5'. One advantage of the double gripper 1 is, inter alia, that the length region of the cable ends, which is not twisted, can be kept small.

The engagement members 11 are designed as active members and can be moved further from the position shown here between the cables 8, 9 in the y-direction or away from them. The directions of movement for moving the engagement members into the cable harness (retraction and advancement) and for moving the engagement members away from the harness (backward movement) is evidently the same direction as the closing and opening direction of the gripper jaws 2, 3. The retraction and insertion as well as the backward movement of the engagement members on the one hand and the movement of the gripper jaws in the closing direction or opening direction of the gripper jaws on the other take place for the double gripper shown in FIG. 1 in the y-direction. The structure and operation of the double gripper 1 will be explained in detail on the basis of the following FIGS. 2 to 10.

As soon as the double gripper 1 has gripped the cable ends of the cables 8, 9 as desired, the entire double gripper 1 can then be moved in any one or combination of the x-, y- and z-directions depending on the destination in order to complete the provisioning process. The cable ends of the two cables 8, 9 remain fixed in their position in the double gripper 1.

The longitudinal direction designated by A is shown in the figures as a horizontal direction. The two jaw members 4, 4', which form a pair and are associated with the upper cable 8, are arranged at the top and the two jaw members 5, 5', which also form a pair and are associated with the lower cable 9, are arranged at the bottom. For the sake of simplicity and for better understanding, the jaw members 4, 4' are referred to be below as "upper jaw members" and the jaw members 5, 5' are referred to as "lower jaw members". Of course, the double gripper 1 could also be differently oriented and aligned as needed. The longitudinal direction A could, for example, be vertical or any other direction. The jaw members 4, 4'; 5, 5' could be rotated around the axis A. Instead of the horizontal main movement directions shown here, the gripper jaws 2, 3, its jaw members 4, 4'; 5, 5' and the engagement members 11 could also be moved in the vertical direction (in the direction of the x-axis).

The double gripper 1 can engage with the two cables 8, 9 as follows: The prefabricated ends of the cables 8, 9 are aligned in a conventional manner. In that case, the double gripper 1 can accommodate the two individual cable ends. The pair with the engagement members 11 is inserted into the middle between the two cables 8, 9 and moves them together until the desired distance (H) of the cable 8, 9 is reached (refer to the following FIGS. 2b, 3b). The upper jaw members 4, 4' and the lower jaw members 5, 5' are also moved together, so that a single cable end is clamped in four places by one gripper and the wedge pair. It is also possible to securely fix the respective cables with the double gripper 1 in only three places instead of four. In that case, the upper cable 8 is then only clamped between the upper jaw members 4, 4' and only one of the engagement members 11; the lower cable 9 is then only clamped between the lower jaw members 5, 5' and the other engagement member 11. This three-point mounting allows for special operating modes of the double gripper. Thanks to the three-point mounting, for example, it is possible to create an offset between the cables.

In order to allow for the provisioning of plug housings with different distances between the cells, the distance between the cables 8, 9 must be adjusted accordingly. The double gripper 1 makes it very easy to adjust the distance in which the engagement members 11 are moved forward or backward after an appropriate activation until the desired cable distance is reached. FIGS. 2 and 3 show examples of how the cable distance can be changed. FIG. 2 (FIGS. 2a and 2b) shows the double gripper 1 with gripper jaws 2, 3 in the closed position. In the position shown in FIG. 2, the engagement members 11 are retracted so far that the cables 8, 9 are separated by a certain distance H (FIG. 2b). To increase the distance H between the cables 8, 9, the engagement members 11 are retracted in the space between the cables 8, 9 in the direction e or e'. The cables 8, 9 are thus forced apart by the engagement members 11 configured as wedges 21, 22, which causes the distance between the cables to increase. To compensate for the upward and downward movements of the cables 8, 9, the jaw members 4, 4'; 5, 5' are shifted laterally. For this purpose, the jaw members 4, 4'; 5, 5' are slightly slidably positioned in the gripper jaws 2, 3 in the closing or opening direction. FIG. 3 (FIGS. 3a and 3b) shows the double gripper 1 with engagement members 11, which are further retracted compared to the starting position shown in FIGS. 2a, 2b. The cable distance H is now increased.

The double gripper 1, however, does not only make it possible to change the distance H between the cables 8, 9. The double gripper 1 is also suitable for gripping and handling cable ends of cables with different cable diameters. As can be seen from FIGS. 4a and 4b, the same double gripper 1 can also grasp cables 8, 9 with a significantly larger cable diameter. A conversion is not necessary.

FIG. 2b shows as well that the engagement members 11 are configured as wedges 21, 22. Each wedge 21, 22 has two oblique, effective wedge surfaces that can act upon both cables 8, 9. The wedge surfaces of the left wedge 21 are designated as 25 and 26 and the wedge surfaces of the right wedge 22 are designated as 25' and 26'. The symmetrically shaped wedges 21, 22 are designed as double wedges in the cross section. The wedge angle $\gamma$ of the wedges 21, 22 is 60° in the present embodiment.

The upper jaw members 4, 4', which face each other, which can be moved toward and away from each other, and which form a pair, comprise clamping surfaces 23, 23', which enclose an angle $\alpha$. The angle enclosed by the clamping surfaces 24, 24' of the lower jaw members 5, 5' is correspondingly the same. The angle between the wedges 21, 22 with the wedge surfaces 25 and 25' or 26 and 26' that are facing each other is designated as $\beta$. For a perfect function of the double gripper 1, the angle $\alpha$ should be smaller than the angle $\beta$. In the present embodiment, the angle $\alpha$ between two clamping surfaces 23, 23' of the upper jaw members 4, 4' facing each other is 90°. The same applies with respect to the lower jaw members 5, 5'. The angle $\beta$ between the wedges 21, 22 with the wedge surfaces 25 and 25' or 26 and 26' that are facing each other is 120° in this case. This geometry ensures that the respective cable 8, 9 can be held securely even if it is only enclosed by one wedge 21, 22 and two jaw members 4, 4'; 5, 5' and acted on in a clamping or supporting manner. The cable, which is held on three sides, cannot fall out.

Figure 5A:
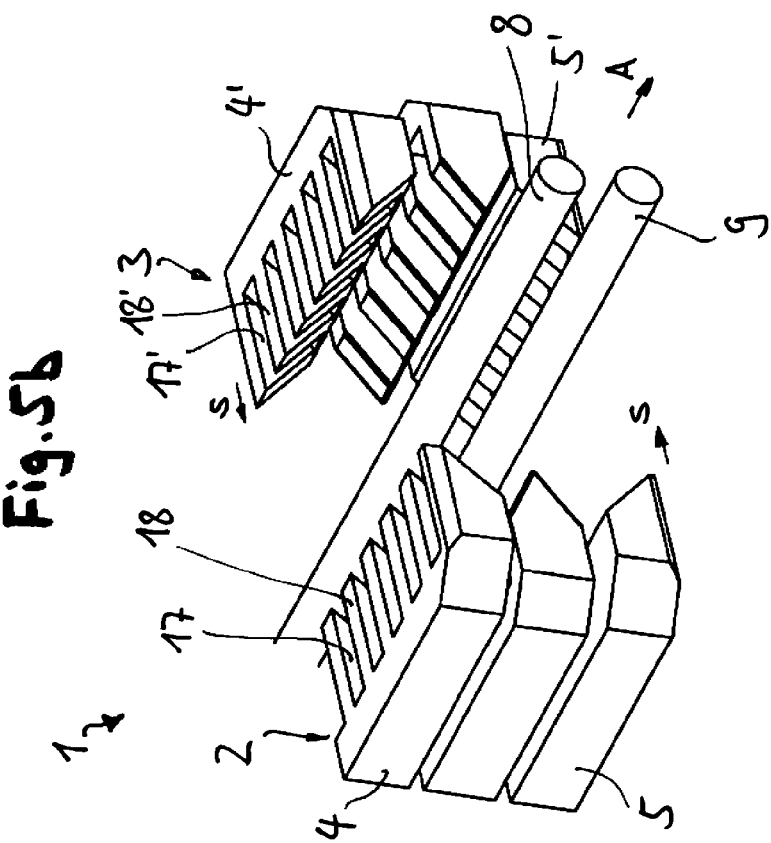
FIG. 5a is a perspective view of the gripper unit in the open position.
Figure 5B:
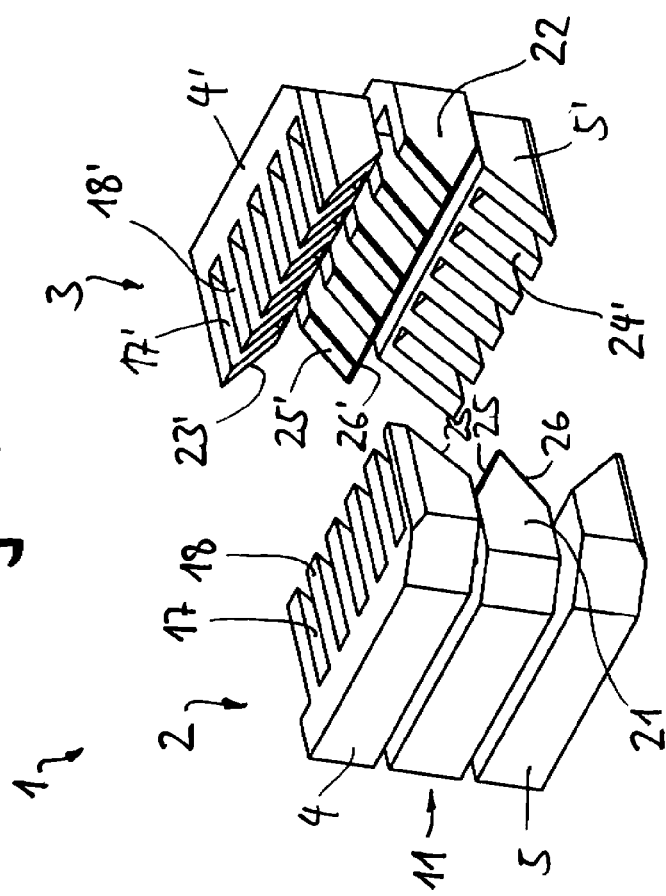
FIG. 5b shows the open gripper unit and two ends of two cables between them.
Figure 9A:
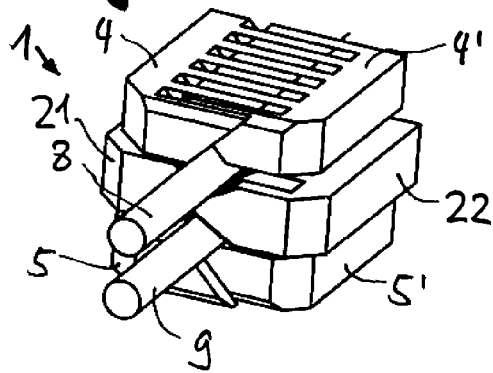
FIGS. 9a-9d are perspective views of the gripper unit during the creation of the offset, each corresponding to individual steps.

Structural details of the design of the double gripper 1 can be obtained from FIGS. 5a, 5b. They show, for example, that both the upper jaw members 4, 4' and the lower jaw members 5, 5' comprise on front sides facing each other complementary slot-like recesses 17, 17' and protrusions 18, 18' between the recesses, which can be moved into each other. The recesses 17, 17' and projections 18, 18' of the jaw members 4, 4'; 5, 5' facing each other are inserted into each other in the closed position (refer to FIG. 1 above, for example). The two wedges 21, 22 that face each other and that can be moved in opposite directions have complementary shaped, slot-like recesses 27, 27' and projections 28, 28' between the recesses in the region of the wedge tips, which can be moved into one another as shown in FIGS. 6 and 7.

FIG. 6 shows again the wedge 22 of the double gripper according to the present first embodiment. As can clearly be seen in particular from FIG. 7, the slot width B of the recesses 27, 27' is dimensioned larger than the width b of the opposing projections 28, 28' of the respective wedges 21, 22 that are immersed into these. This makes it possible to achieve an offset of the cables with the double gripper. After establishing the offset between the cables, one of the wedges 21 is displaced with respect to the other wedge 22 in the longitudinal direction A. FIG. 8b shows the double gripper 1 in such an offset position. The lower cable 9 is moved forward compared to the upper cable 8 by an offset distance L in the axial direction A. FIG. 8a shows the double gripper 1 in a starting position for comparison purposes. The lower cable 9 with the associated jaw members 5, 5' and one of the wedges, here by way of example wedge 22, was moved forward along the longitudinal direction A by the offset distance of a few millimeters. For cables with resilient insulation, it is sufficient if the wedge surfaces 25, 25'; 26, 26' of the wedges 21, 22 are designed so that their friction on the cable insulation of the cable is small.

Figure 10A:
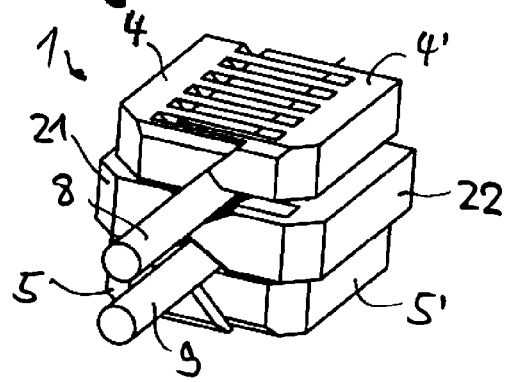
FIGS. 10a-10d are perspective views of the gripper unit during an alternative creation of the offset, each corresponding to individual steps.
Figure 9B:
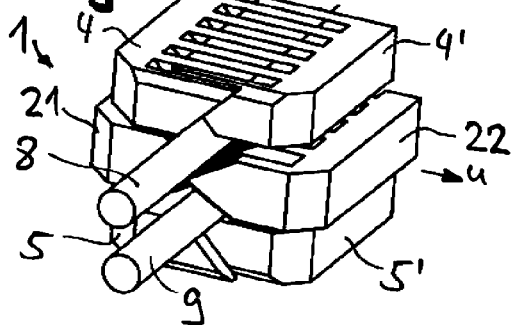
Figure 10B:
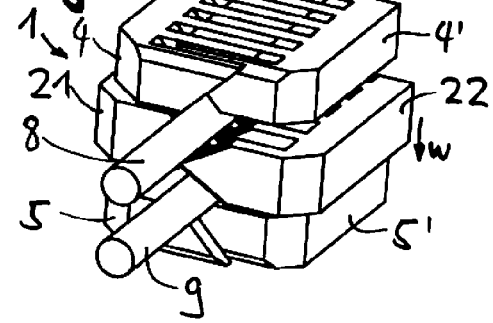
Figure 9C:
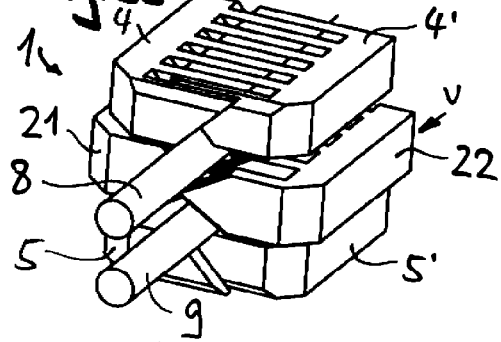
Figure 10C:
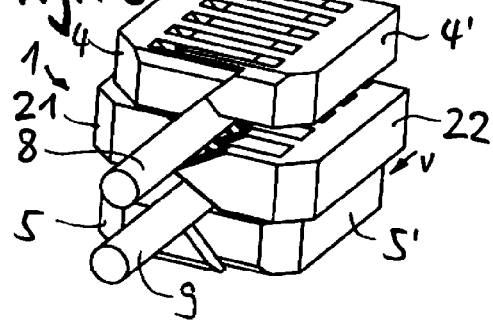
Figure 9D:
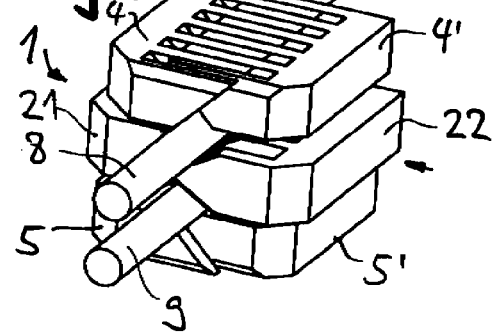
Figure 10D:
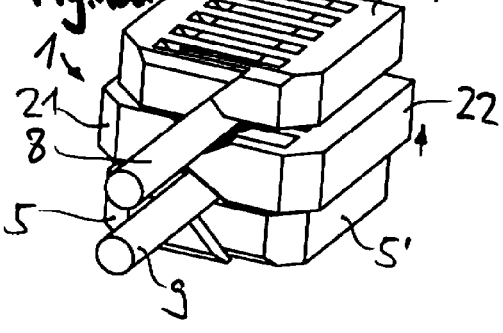

For cables with sensitive insulation, the offset can be created according to a modified procedure. The individual steps for creating the offset by means of the double gripper 1 according to the modified method mentioned are shown in FIGS. 9a to 9d. FIGS. 10a to 10d relate to a variant of the modified method for creating the offset. To ensure that the insulation of the cables 8, 9 is not damaged, the process changes as follows: The respective individual ends of the cables 8, 9 are each clamped in three places only by a pair of jaw members 4, 4', 5, 5' and an assigned wedge 21, 22 (FIG. 9a; FIG. 10a). The split gripper groups, i.e. for example the upper pair of jaw members 4, 4' with the wedge 21 on the one side and the lower pair of jaw members 5, 5' with the wedge 22 on the other side now move further apart from each other until the respective other wedges 22, 21, which are not part of the gripper group, no longer have any contact with the respective cables 8, 9. This can be achieved by moving one of the gripper groups, for example, the gripper with the pair of lower jaw members 5, 5' and the wedge 22 in the direction of the arrow u (FIG. 9b), or by moving this gripper group upward in the direction of the arrow w (FIG. 10b). Thereafter, the amount of offset in the cable direction is traversed by said gripper group with the pair of lower jaw members 5, 5' and the wedge 22 in the direction of the arrow v (FIG. 9c, FIG. 10c) and the two gripper groups are brought together again (FIG. 9d, FIG. 10d). The directions of movement for bringing the two gripper groups together are indicated in FIGS. 9d and 10d by arrows which, as can be seen, extend in the opposite direction of those in FIGS. 9b and 10b.

FIGS. 11a to 11d relate to a second exemplary embodiment of a double gripper 1. The wedges 21, 22 used here each have only one effective wedge surface. The gripper unit 1 comprises, as shown in FIG. 11a, wedges 21, 22, which form a pair, and which can be moved toward and away from each other, each having an oblique effective wedge surface 23, 23' and a respective straight wedge surface 32, 32'. The wedges 21, 22 can, while being moved forward or backward, be slidable along each other on their straight wedge surfaces 32, 32' in the closing or opening direction. The oblique effective wedge surfaces 23, 23' are profiled so that the cables can safely be held in place. The straight wedge surfaces 32, 32' have a planar design for the interdependent guiding of the wedges, whereby they form sliding surfaces for the aforementioned movement. The jaw members 4, 4'; 5, 5' are configured approximately the same as those according to the preceding embodiment. As can be clearly seen from FIGS. 11c and 11d, the cables 8, 9 are also gripped in the double gripper 1 in a three-point mounting when the double gripper 1 is closed. With the double gripper 1 according to this embodiment, cables 8, 9 with sensitive insulation can be brought into an offset position in a straight movement in the longitudinal direction without intermediate steps, which saves processing time. An advantage over the first embodiment is that a relatively large offset distance is possible.

FIGS. 12a to 12e relate to a third exemplary embodiment of a double gripper 1. This double gripper 1 is characterized by a particularly gentle treatment of the cables. The double gripper 1 comprises engagement members 11, which form a pair, which can be moved toward and away from each other, and which are in the shape of a wedge. The respective wedge-shaped engagement members 11 are equipped with straight wedge surfaces 33, 33' and oblique wedge surfaces 34, 34' with respect to the direction of movement for advancing or retracting the engagement members. The straight wedge surfaces 33, 33', which are horizontal in FIGS. 12a to 12e, serve to support the respective cables 8, 9. This can also be done with less clamping pressure, which is why this embodiment is particularly suitable for handling cables with thick, very soft insulation. The oblique wedge surfaces 34, 34' of the engagement members 11 can be brought into operative connection with one another such that the oblique wedge surfaces 34, 34' are dependently guided during the forward or backward movement of the engagement members 11 in the closing direction s or in the opening direction o. The clamping surfaces of the jaw members 4, 4'; 5, 5' involved and the wedge-shaped engagement members 11 form corners with angles of 90° and 45°. These angles are sufficiently blunt that the respective cable 8, 9, even if it has a thick and soft insulation, cannot be pressed laterally out of the double gripper. The path of movement of the engagement members 11 designated by 35 (FIG. 12a) is tilted by the angle A. With this double gripper 1, even sensitive cables can be gripped without being damaged and taken to the desired destination.

Figure 13:
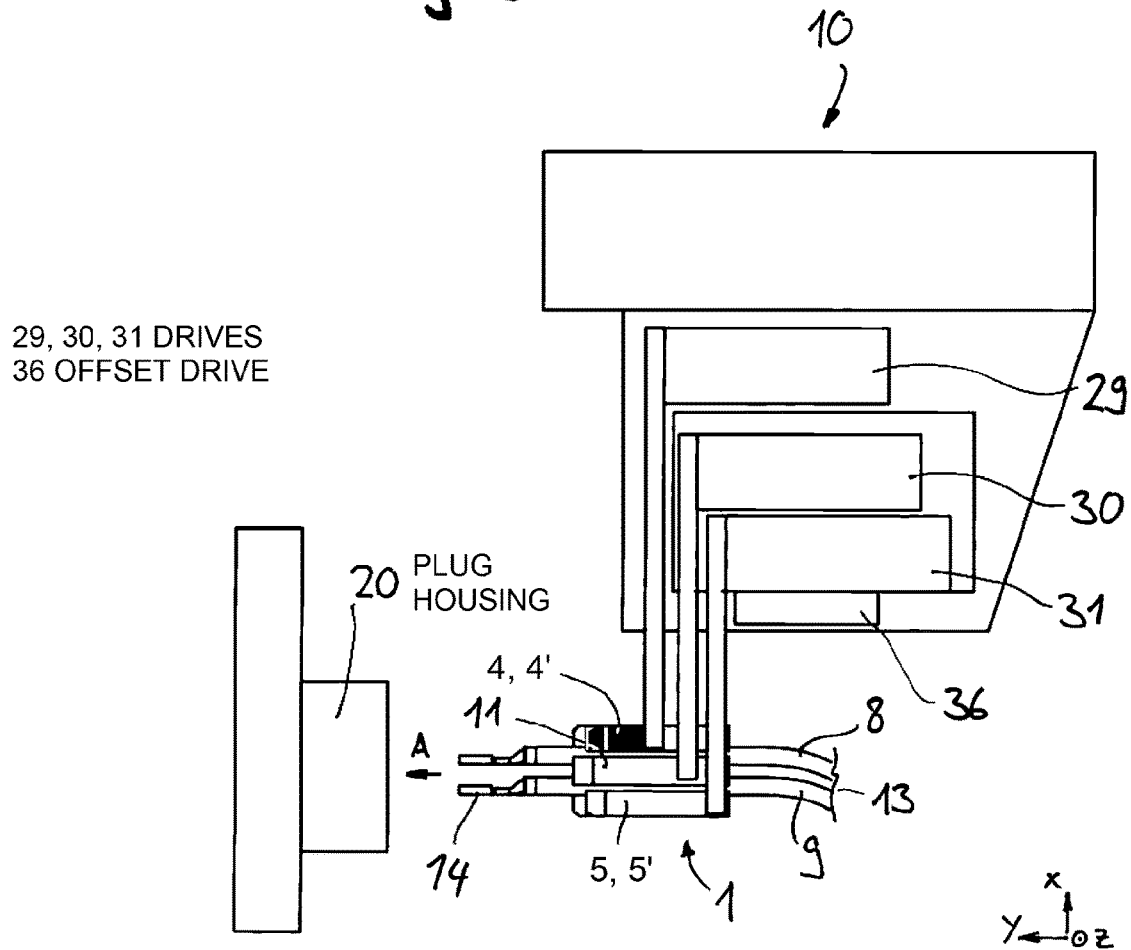
FIG. 13 is a simplified side view of a fitting station with a gripper unit according to the invention.

FIG. 13 shows a fitting station 10 for provisioning plug housings 20 with prefabricated cable ends of cables 8, 9 by means of a double gripper 1 as described above. The double gripper 1 grips the prefabricated cable ends of two cables of a cable harness 13 and inserts the cable ends of the two cables 8, 9 into cells of the plug housing 20. As can be seen from FIG. 13, the upper jaw members 4, 4' and the lower jaw members 5, 5' and also the engagement members 11 each have their own drives for operating and performing the necessary transverse movements in the y-direction. The drive designated as 29 is assigned to the upper jaw members 4, 4', the drive designated as 31 is assigned to the lower jaw members 5, 5' and the drive designated as 30 is associated with the engagement members 11. After the receipt of commands transmitted by a control device (not shown here), the drives 29, 30 and 31 are activated and the movements of the components (upper jaw members 4, 4', lower jaw members 5, 5', engagement members 11) of the double gripper necessary to create the open position or the closed position of the gripper jaws and to advance or retract the engagement members are performed.

It can also be seen from FIG. 13 that the lower jaw members 5, 5' and the associated engagement member 11 are combined to form a group and that the jaw members 5, 5' and the engagement member 11 are grouped together and can be moved to create an offset by means of an offset drive 36 in the longitudinal direction A (y direction).

Figure 14:
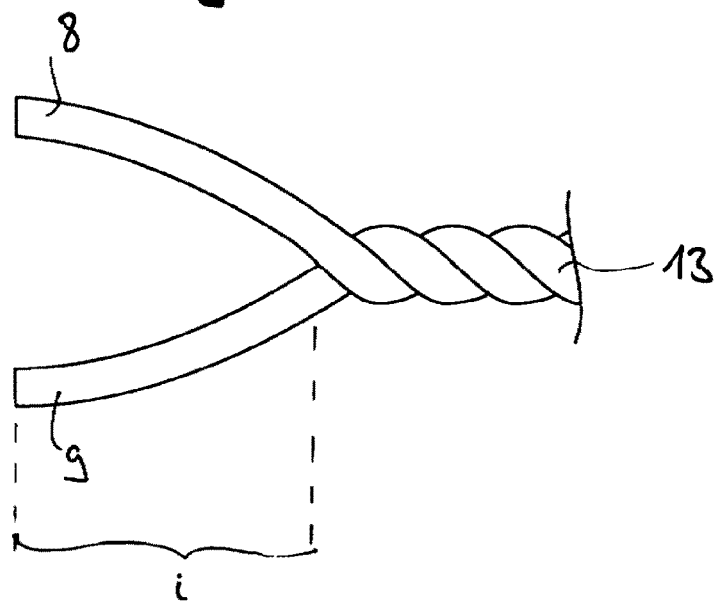
FIG. 14 is a view of a twisted cable harness consisting of two cables with one untwisted end of a cable harness with two cables.

FIG. 14 shows an end of a twisted wire harness 13 with two cables 8, 9. The non-twisted or untwisted end of the cable harness 13 is denoted as i. Since usually only the untwisted end i of the cable harness 13 can be detected by the double gripper 1, it may be important, for example in view of a high signal transmission quality of the twisted cable harness 13, to keep the section i as short as possible.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A gripper unit for gripping and handling cable ends of two cables of a cable harness comprising:
   two gripper jaws being arranged on opposite sides of a longitudinal direction that is parallel to longitudinal axes of the two cables, the gripper jaws being movable transverse to the longitudinal direction toward each other to a closed position where the two gripper jaws overlap with each other and with the longitudinal axes of the cables and away from each other to an open position;
   wherein at least one of the gripper jaws has an upper jaw member and a lower jaw member; and
   at least one engagement member that is separate from the gripper jaws, activatable and arranged between the upper jaw member and the lower jaw member, wherein the at least one engagement member penetrates between the cables such that the cables are acted upon from an outside by the gripper jaws and the at least one engagement member in the closed position with one of the cables being clamped between the upper jaw member and the at least one engagement member and another of the cables being clamped between the lower jaw member and the at least one engagement member.

2. The gripper unit according to claim 1 wherein the at least one engagement member is movable independently of the gripper jaws.

3. The gripper unit according to claim 1 including two of the at least one engagement member, wherein each of the gripper jaws has one of the upper jaw member and one of the lower jaw member, and wherein each of the engagement members is arranged between the upper jaw member and the lower jaw member of an associated one of the gripper jaws.

4. The gripper unit according to claim 1 including a drive that moves the at least one engagement member independently of the gripper jaws.

5. The gripper unit according to claim 1 wherein each of the gripper jaws has one of the upper jaw member and one of the lower jaw member, wherein the jaw members are slidably mounted in the gripper jaws for movement between the closed position and the open position, and whereby, insertion of the at least one engagement member between the cables or retraction of the at least one engagement member from between the cables varies a distance between the cables transverse to the longitudinal direction.

6. The gripper unit according to claim 1 wherein the at least one engagement member is formed as a wedge with at least one effective wedge surface.

7. The gripper unit according to claim 6 wherein the wedge has two of the effective wedge surface and a wedge angle between the wedge surfaces is between 30° and 90°.

8. The gripper unit according to claim 7 wherein the wedge angle is between 45° and 70°.

9. The gripper unit according to claim 7 wherein the wedge angle is 60°.

10. The gripper unit according to claim 1 wherein each of the gripper jaws has one of the upper jaw member and one of the lower jaw member, each of the jaw members having a clamping surface for contacting one of the cables, wherein the clamping surfaces of the upper jaw members face each other to enclose a first angle and the clamping surfaces of the lower jaw members face each other to enclose the first angle, including two of the at least one engagement member, wherein each of the engagement members is formed as a wedge with a pair of wedge surfaces, each of the wedge surfaces for contacting one of the cables, the wedge surfaces of one of the engagement members facing corresponding ones of the wedge surfaces of another of the engagement members, the facing wedge surfaces enclosing a second angle wherein the first angle is smaller than the second angle.

11. The gripper unit according to claim 10 wherein the first angle is 90° and the second angle is 120°.

12. The gripper unit according to claim 1 including two of the at least one engagement member each formed as a wedge, each of the wedges having an oblique effective wedge surface and a straight wedge surface, and wherein the wedges are slidably movable relative to one another along the straight wedge surfaces.

13. The gripper unit according to claim 1 including two of the at least one engagement member that form a pair and that can be moved toward and away from each other, wherein each of the engagement members of the pair is wedge-shaped and has a straight wedge surface and an oblique wedge surface, wherein the straight wedge surfaces support the cables and the oblique wedge surfaces can be brought into an operative connection with each other such that the oblique wedge surfaces are dependently guided during a forward movement or a backward movement of the engagement members in a closing direction or an opening direction, respectively, of the gripper jaws.

14. The gripper unit according to claim 1 wherein the at least one engagement member is formed of or coated with a plastic material.

15. The gripper unit according to claim 1 wherein each of the gripper jaws has one of the upper jaw member and one of the lower jaw member, the upper jaw members facing each other and the lower jaw members facing each other, wherein the facing jaw members have complementary slot-like recesses and projections between the recesses, and whereby in the closed position the projections are inserted into the complementary recesses.

16. The gripper unit according to claim 1 including two of the at least one engagement member each formed as a wedge, the wedges facing each other and being movable in opposite directions transverse to the longitudinal axis between an open position and a closed position, wherein the wedges have complementary slot-like recesses and projections between the recesses whereby the projections are inserted into the complementary recesses when the wedges are moved into the closed position of the wedges.

17. The gripper unit according to claim 16 wherein a slot width of each of the recesses is larger than a width of the complementary protrusion whereby the wedges are movable relative to each other in the longitudinal direction for creating an offset of the cable ends in the longitudinal direction.

18. A fitting station for provisioning plug housings with pre-fabricated cable ends comprising a gripper unit according to claim 1 for gripping cable ends of two cables of a twisted cable harness and inserting each of the cable ends into a selected cell of a plug housing.

19. A method for provisioning plug housings with pre-fabricated cable ends of two cables of a twisted cable harness, comprising the following steps:
providing the gripper unit according to claim 1;
operating the gripper unit to grip the two cables, wherein an outside of each of the cables is enclosed by the gripper jaws and the cables are supported by the at least one engagement member that is inserted between the cables;
adjusting a distance between the cables by moving the at least one engagement member forward or backward transverse to the longitudinal direction; and
inserting the cable ends of the cables into selected cells of a plug housing using the cable gripper unit while maintaining the distance between the cables.

20. A gripper unit for gripping and handling cable ends of two cables of a cable harness comprising:
two gripper jaws being arranged on opposite sides of a longitudinal direction that is parallel to longitudinal axes of the two cables, the gripper jaws being movable transverse to the longitudinal direction toward each other to a closed position and away from each other to an open position;
wherein at least one of the gripper jaws has an upper jaw member and a lower jaw member;
at least one engagement member that is separate from the gripper jaws, activatable and arranged between the upper jaw member and the lower jaw member, wherein the at least one engagement member penetrates between the cables such that the cables are acted upon from an outside by the gripper jaws and the at least one engagement member in the closed position with one of the cables being clamped between the upper jaw member and the at least one engagement member and another of the cables being clamped between the lower jaw member and the at least one engagement member; and
a drive that moves the at least one engagement member independently of the gripper jaws.

21. A method for provisioning plug housings with pre-fabricated cable ends of two cables of a twisted cable harness, comprising the following steps:
providing a gripper unit having two gripper jaws arranged on opposite sides of a longitudinal direction that is parallel to longitudinal axes of the two cables, the gripper jaws being movable transverse to the longitudinal direction toward each other to a closed position and away from each other to an open position, wherein at least one of the gripper jaws has an upper jaw member and a lower jaw member, and at least one engagement member that is separate from the gripper jaws, activatable and arranged between the upper jaw member and the lower jaw member, wherein the at least one engagement member penetrates between the cables such that the cables are acted upon from an outside by the gripper jaws and the at least one engagement member in the closed position with one of the cables being clamped between the upper jaw member and the at least one engagement member and another of the cables being clamped between the lower jaw member and the at least one engagement member;
operating the gripper unit to grip the two cables, wherein an outside of each of the cables is enclosed by the gripper jaws and the cables are supported by the at least one engagement member that is inserted between the cables;
adjusting a distance between the cables by moving the at least one engagement member forward or backward transverse to the longitudinal direction; and
inserting the cable ends of the cables into selected cells of a plug housing using the cable gripper unit while maintaining the distance between the cables.

* * * * *